US005692193A

United States Patent [19]

Jagannathan et al.

[11] Patent Number: 5,692,193
[45] Date of Patent: Nov. 25, 1997

[54] SOFTWARE ARCHITECTURE FOR CONTROL OF HIGHLY PARALLEL COMPUTER SYSTEMS

[75] Inventors: Suresh Jagannathan, Princeton; James F. Philbin, Metuchen, both of N.J.

[73] Assignee: NEC Research Institute, Inc., Princeton, N.J.

[21] Appl. No.: 221,026

[22] Filed: Mar. 31, 1994

[51] Int. Cl.$^6$ .................................................. G06F 13/00
[52] U.S. Cl. ........................ 395/676; 395/406; 395/683
[58] Field of Search .............................. 395/700, 650, 395/406, 676, 683

[56] References Cited

U.S. PATENT DOCUMENTS

| | | | |
|---|---|---|---|
| 4,545,012 | 10/1985 | Clancy et al. | 364/200 |
| 4,554,626 | 11/1985 | Katz et al. | 364/200 |
| 4,827,403 | 5/1989 | Steele, Jr. et al. | 364/200 |
| 5,063,500 | 11/1991 | Shorter | 395/200 |
| 5,083,265 | 1/1992 | Valiant | 395/800 |
| 5,095,427 | 3/1992 | Tanaka et al. | 395/700 |
| 5,109,510 | 4/1992 | Baker et al. | 395/650 |
| 5,129,083 | 7/1992 | Cutler et al. | 395/600 |
| 5,129,084 | 7/1992 | Kelly, Jr. et al. | 395/650 |
| 5,136,712 | 8/1992 | Perazzoli, Jr. et al. | 395/700 |
| 5,148,544 | 9/1992 | Cutler et al. | 395/725 |
| 5,168,554 | 12/1992 | Luke | 395/161 |
| 5,179,702 | 1/1993 | Spix et al. | 395/650 |
| 5,201,049 | 4/1993 | Shorter | 395/650 |
| 5,220,501 | 6/1993 | Lawlor et al. | 364/408 |
| 5,247,675 | 9/1993 | Farrell et al. | 395/650 |
| 5,337,412 | 8/1994 | Baker et al. | 395/275 |
| 5,390,309 | 2/1995 | Onodera | 395/400 |
| 5,530,820 | 6/1996 | Onodera | 395/406 |

OTHER PUBLICATIONS

David Kranz et al, "Orbit: An Optimizing Compiler for Scheme", in ACM SIGPLAN Notices, 21 (7): pp. 219–233, Jul. 1986.

Jonathan Rees et al, "Revised$^3$ Report on the Algorithmic Language Scheme" in ACM SIGPLAN Notices, 21 #12, pp. 38–79, Dec. 1986.

Primary Examiner—Kevin A. Kriess
Attorney, Agent, or Firm—Philip J. Feig

[57] ABSTRACT

A computer software architecture for controlling a highly parallel computer system comprises several layers of abstraction. The first layer is an abstract physical machine which contains a set of abstract physical processors. This layer may be considered as a microkernel. The next layer includes virtual machines and virtual processors. A virtual machine comprises a virtual address space and a set of virtual processors that are connected in a virtual topology. Virtual machines are mapped onto abstract physical machines with each virtual processor mapped onto an abstract physical processor. The third layer of abstraction defines threads. Threads are lightweight processes that run on virtual processors. In a preferred embodiment the abstract physical machines, abstract physical processors, virtual machines, virtual processors, thread groups, and threads are all first class objects.

21 Claims, 9 Drawing Sheets

FIG. 6

```
(define (filter op n input)
  (let loop ((x (hd input))
             (output (make-stream))
             (last? true))
    (cond ((zero? (mod x n))
           (loop (rest input) output last?))
          (last?
           (op (lambda () (filter op x output)))
           (loop (rest input) (attach x output) false))
          (else (loop (rest input) (attach x output) last?)))))

(define (sieve op n)
  (let ((input (make-integer-stream n)))
    (op (lambda () (filter op 2 input)))))
```

FIG. 7

```
(define (create-3D-mesh depth)
  (let* ((pm-width (get-pm-width))
         (pm-heigth (get-pm-height))
         (3D-mesh (make-array w h depth)))
    (let -*- ((i 0))
      (if (< i pm-width)
          (let -**- ((j 0))
            (if (< j pm-height)
                (let ((vp (create-vp (get-pp i j))))
                  (set-vp-address vp (vector i j))
                  (let -***- ((k 0))
                    (cond ((< k depth)
                           (set-aref! 3D-mesh vp)
                           (-***-(+ k 1)))))
                  (-**- (+ j 1)))))))))
```

FIG. 8

```
(define (start-context-switch next-state)
  (disable-preemption)
  (let* ((vp (current-vp))
         (next (let ((obj (tpm-get-next-thread vp)))
                 (if (false? obj)
                     (if (tcb-state-ready? next state)
                         (current-tcb)
                         (tpm.vp-idle vp))
                     obj))))
    (cond ((eq? next (current-tcb)))
          ((tcb? next)
           (set-tcb.state next tcb-state/running)
           (set-thread.vp (tcb.thread next) vp)
           (cond ((eq? next-state tcb-state/dead)
                  (return-current-tcb-to-vp-pool vp)
                  (restore-tcb-and-registers next))
                 (else
                  (save-current-tcb-registers)
                  (restore-tcb-and-registers next))))
          ((thread? next)
           (thread-mutex-acquire next)
           (let ((tcb (allocate-tcb next-state vp)))
             (setup-new-thread next vp tcb)
             (if (neg? tcb (current-tcb))
                 (save-current-tcb-registers))
             (thread-mutex-release next)
             (start-new-tcb tcb start-new-thread))))))
```

FIG. 9

```
(define (finish-context-switch)
  (let* ((vp        (current-vp))
         (previous  (vp.current-tcb vp))
         (state     (tcb.state previous)))
    (set-vp.current-tcb vp (current-tcb))
    (cond ((neg? previous (current-tcb))
           (cond ((tcb-state-ready? state)
                  (if (neg? previous (vp.root-tcb vp))
                      (tpm-enqueue-ready-thread vp previous)))
                 ((tcb-state-blocked? state)
                  (thread-mutex-release (tcb.thread previous)))
                 ((tcb-state-suspended? state)
                  (tpm-enqueue-suspended-thread vp (tcb.thread previous))
                  (thread-mutex-release (tcb.thread previous))))))
    (enable-preemption)))
```

FIG. 10

```
(define (start-new-thread)
  (let ((z (error-value "Thread has no value")))
    (unwind-protect (set z (catch exit
                             (set-tcb.exit-handler (current-tcb) exit)
                             ((thread.thunk (current-thread)))))
      (let ((thread (current-thread)))
        (thread-gc thread)
        (set-thread.value thread z)
        (wakeup-waiters thread)
        (set-tcb.state (current-tcb) tcb-state/dead)
        (start-context-switch tcb-state/dead)))))
```

FIG. 11

```
(define (pbisort root spare up?)
  (cond ((node-left root)
         (let ((left-half (future (pbisort (node-left root) root up?))))
           (pbisort (node-right root) spare (not up?))
           (touch left-half)
           (pbimerge root spare up?)))
        (else (compare-and-swap root spare up?))))

(define (pbimerge root spare up?)
  (let loop ((root root) (spare spare))
    (if (compare-and-swap root spare up?)
        (fixup-tree-1 root up?)
        (fixup-tree-2 root up?))
    (cond ((node-left root)
           (let ((left-half (future (loop (node-left root) root))))
             (loop (node-right root) spare)
             (touch left-half))))))
```

FIG. 12

```
(define (block-on-set count threads)
  (thread-mutex-acquire (current-thread))
  (let loop ((threads threads)
             (cnt count))
    (cond ((fx-zero? cnt)
           (thread-mutex-release (current-thread)))
          ((null? threads)
           (set-tcb.wait-count (current-tcb) cnt)
           (tcb-state->blocked (current-thread)))
          (else (let ((thread (car threads)))
                  (thread-mutex-acquire thread)
                  (cond ((thread-determined? thread)
                         (thread-mutex-release thread)
                         (loop (cdr threads) (fx- cnt 1)))
                        (else (let ((tb (make-tb)))
                                (set-tb.waiter tb (current-thread))
                                (set-tb.thread tb thread)
                                (set-tb.next tb (thread. waiters thread))
                                (set-thread.waiters thread tb))
                              (thread-mutex-release thread)
                              (loop (cdr threads) cnt)))))))))
```

SOFTWARE ARCHITECTURE FOR CONTROL OF HIGHLY PARALLEL COMPUTER SYSTEMS

FIELD OF INVENTION

The present invention relates to a computer software architecture designed to serve as a highly efficient substrate for modern programming languages. The software architecture controls highly parallel computer systems.

The present computer software architecture relies upon an operating system which separates control issues from policy issues. This separation occurs at two different abstraction levels in the system: in the Abstract Physical Processor and in the Virtual Processor. Each of these abstractions is separated into two components, the "controller" which implements the control portion of the abstraction and the "policy manager" which makes policy decisions for the controller. Separating control from policy permits definitions of different behaviors for what is functionally the same system by modifying only the policy manager portion of the abstraction.

Specifically, the software architecture supports lightweight threads of control and virtual processors as first-class objects. Concurrency mangement is implemented in terms of first class procedures and continuations, thereby permitting optimization of the runtime behavior of the application without requiring the user to have knowledge of the underlying runtime system.

More specifically, the invention concerns a design for building asynchronous concurrency structures, an implementation of a thread controller using continuations as its basic control mechanism, an organization of large-scale concurrent computations and robust programming environments for parallel computing.

BACKGROUND OF THE INVENTION

The growing interest in parallel computing has led to the creation of a number of parallel programming languages that define explicit high-level program and data structures for expressing concurrency. Parallel languages targeted for non-numerical application domains typically support (with varying degrees of efficiency) concurrency structures that realize dynamic lightweight process creation, high-level synchronization primitives, distributed data structures, and speculative concurrency. In effect, all these parallel languages may be viewed as comprising two sublanguages—a coordination language responsible for managing and synchronizing the activities of a collection of processes, and a computation language responsible for manipulating data objects local to a given process.

Traditionally, there have been several classes of operating system including: real time, interactive, and batch. These three classes have provided different interfaces to the user and thus porting a program from one class of operating system (OS) to another has been difficult. Additionally, since the scheduling decisions made by each class are different, it is difficult to debug a program for one, e.g. a real time application, on another, e.g. an interactive development system, and have confidence that the application will run correctly and efficiently on the target system.

The situation is complicated further by the number of different scheduling regimes used in each of these classes of systems. For example, some real time systems use a fixed scheduling order for processes, some use a priority discipline, some use a running quantum discipline, and still others use a combination of these. Interactive operating systems or batch operating systems have at least as many scheduling alternatives if not more.

Separating control from policy allows the building of one operating system that can be easily customized for various classes of operating systems. In the present invention the modules implementing policy managers typically are very small relative to the size of the system—comprising in general less than one hundred lines of code. Thus, usually it is only necessary to write a small piece of code to build a new system with different policy behavior. Additionally, since the policy manager presents a well defined interface only the new policy manager need be tested and not the entire system when the policy behavior is changed.

Hydra, (described in the book "HYDRA/C.mmpi: An Experimental Computer System", by William Wulf, Roy Lexia and Samuel Harbison, McGraw-Hill, 1991), was the first operating system designed with the separation of the control and policy in mind, but Hydra allowed policy customization only at the kernel level. The present invention goes further by allowing the programmer to customize policy decisions as they relate to a particular program. Thus an interactive program such as an editor or window manager can have very different policies from a compute intensive program such as a fluid dynamics simulation or finite elements computation. Separation of control from policy in Hydra is also expensive since it required several context switches between the kernel and the policy manager. In the present invention policy managers are generally linked directly into the appropriate address space and require no context switching. They are thus at least as efficient as traditional (non-customizable) operating system policy management and usually more efficient.

One method of implementing a high-level parallel language is to build a dedicated (user-level) virtual machine. The virtual machine serves primarily as a substrate that implements the high-level concurrency primitives found in the coordination sublanguage. Given a coordination language L supporting concurrent primitive P, the role of L's virtual machine ($L_p$) is to handle all implementation aspects related to P; this often requires that the machine manage process scheduling, storage, management, synchronization, and the like. However, because $L_p$ is tailored only towards efficient implementation of P, it is often unsuitable for implementing significantly different concurrency primitives. Thus, to build a dialect of L with concurrency primitive P' usually requires either building a new virtual machine or expressing the semantics of P' using P. Both approaches have obvious drawbacks: the first is costly to implement given the complexity of implementing a new virtual machine; the second is inefficient given the high-level semantics of P and $L_p$'s restricted functionality.

Rather than building a dedicated virtual machine for implementing concurrency, a language implementation may use low-level operating system services. Process creation and scheduling is implemented by creating heavy- or lightweight OS-managed threads of control; synchronization is handled using low-level OS-managed structures. These implementations tend to be more portable and extensible than systems built around a dedicated runtime system, but they necessarily sacrifice efficiency since every (low-level) kernel call requires crossing a protection boundary between the application and the operating system. Moreover, generic OS facilities perform little or no optimization at either compile time or runtime since they are usually insensitive to the semantics of the concurrency operators of interest.

SUMMARY OF THE INVENTION

The present invention concerns the implementation of a coordination substrate that permits the expression of a wide range of concurrency structures within the context of a high level programming language. The invention defines a general-purpose coordination model on top of which a number of specialized coordination languages can be efficiently implemented. In practicing the invention, the software Scheme as described by Jonathan Rees and William Clinger, editors in "The Revised Report on the Algorithmic Language Scheme" in ACM Sigplan Notices, 21(12), 1986, was used as the computation base. Scheme is a higher-order lexically scoped dialect of Lisp. While Scheme is the preferred language, it should be apparent to those skilled in the art that the design of the substrate could be incorporated into any modern (high-level) programming language.

The operating system is designed to run primarily on MIMD (multiple instruction—multiple data) parallel computers, with either shared or disjoint memory, as well as distributed machines comprising networks of workstations. The software architecture uses a shared virtual memory model when executing on disjoint memory or distributed memory machines. It has been used to implement many different algorithms corresponding to different paradigms of parallelism including result parallelism, master/slave parallelism and speculative parallelism. Several different parallel programming models have been implemented on top of the operating system including futures, first class tuple spaces and engines.

The dialect of Scheme comprising the operating system which is a feature of a preferred embodiment of the present invention (called Sting), includes a coordination language (implemented via a dedicated virtual machine) for expressing asynchronous lightweight concurrency that combines the best of both approaches. In contrast to other parallel Scheme systems and parallel dialects of similar high-level languages, the basic concurrency objects in Sting (threads, virtual processors, and physical processors) are streamlined data structures with no complex synchronization requirements. Unlike parallel systems that rely on OS services for managing concurrency, Sting implements all concurrency management issues in terms of Scheme objects and procedures, permitting users to optimize the runtime behavior of applications without requiring knowledge of underlying OS services. Sting supports the features essential to creating and managing various forms of asynchronous parallelism with a conceptually unified and very general framework.

Results have shown that it is possible to build an efficient substrate upon which various parallel dialects of high-level languages can be built. Sting is not intended merely to be a vehicle that implements stand-alone short-lived programs, it is anticipated that this system will provide a framework for building a rich programming environment for parallel computing. In this regard, the system provides support for thread preemption, per-thread asynchronous garbage-collection, exception handling across thread boundaries, and application dependent scheduling policies. In addition, it contains the necessary functionality to handle persistent long-lived objects, multiple address spaces and other features commonly associated with advanced programming environments.

In Sting, virtual processors are multiplexed on abstract physical processors and threads are multiplexed on virtual processors. All policy decisions relating to this multiplexing are decided by policy managers. Decisions relating to the multiplexing of virtual processors on physical processors are made by the Virtual Processor Policy Manager (VPPM) while decisions relating to the multiplexing of threads on virtual processors are made by the Thread Policy Manager (TPM).

Policy managers make three types of decisions: how to map a new object (VP or thread) onto a processor (physical or virtual) when the object is created or resumed, what order to run the objects mapped on a particular processor, and when to remap or move an object from one processor to another.

Sting is an operating system designed to support modern programming languages such as Scheme, SmallTalk, ML, Modula3, or Haskell. It provides a foundation of low level, orthogonal constructs, that allows the language designer or implementor to build the various constructs required by these languages easily and efficiently.

Modern programming languages have more extensive requirements than traditional programming languages such as Cobol, Fortran, C or Pascal. Even though Sting is designed to support modern programming languages, it accommodates traditional programming languages, just as efficiently. The list below identifies some of the elements that distinguish modern from traditional languages.

Parallelism—The growing availability of general purpose multi-processors has led to increased interest in building efficient and expressive platforms for concurrent programming. Most efforts to incorporate concurrency into high-level programming languages involve the addition of special purpose primitives to the language.

Multiple Synchronization Models—There are many synchronization protocols used in parallel or asynchronous programming. A modern operating environment should as far as possible provide the primitives to support the various protocols.

Lazy and Eager Evaluation—Many modern languages support either lazy or eager evaluation or both. It is important for the operating system to provide the full range of evaluation strategies from lazy to eager.

Automatic Storage Management—This has become a fundamental feature of many modern languages, because automatic storage management allows more expressive programs, while at the same time reducing both the number of errors in and the complexity of programs.

Topology Mapping—While not yet supported in many programming languages, the ability to control the mapping of processes to processors so as to reduce the communication overhead of a program will become more important as the size of multi-processor computer systems continues to grow and the topologies become more complex.

Sting supports these various elements efficiently. It does so in an architectural framework that is more general and more efficient than those currently available. It also provides the programmer with an increased level of expressiveness and control, and an unparalleled level of customizability.

Four features of the Sting design, when taken as a whole, best distinguish the software architecture from other parallel languages:

1. The Concurrency Abstraction: Concurrency is expressed in Sting via a lightweight thread of control. A thread is a non-strict first-class data structure.
2. The Processor and Policy Abstractions: Threads execute on a virtual processor (VP) that represents an abstraction of a scheduling and load-balancing protocol. There may be many more virtual processors than the actual physical processors available. Like threads, virtual processors are also first-class objects. A VP contains a thread policy manager that determines the scheduling and migration regime for the threads that it executes. Different VPs can, in fact, contain different thread policy managers without incurring any performance penalty. Virtual processors execute on physical processors which are abstractions of actual physical computing devices.

A collection of virtual processors and an address space combine to form a virtual machine. Multiple virtual machines can execute on a single physical machine; physical machines comprise a set of physical processors. Virtual and physical machines are also denotable Scheme objects and may be manipulated as such.

3. Storage Model: A thread allocates data on a stack and heap that it manages exclusively. Thus, threads garbage collect their private state independently of one another; no global synchronization is necessary in order for a thread to initiate a private garbage collection. Data may be referenced across threads. Inter-area reference information is used to garbage collect objects across thread boundaries. Storage is managed via a generational scavenging collector; long-lived or persistent data allocated by a thread is accessible to other threads in the same virtual machine.

The design is sensitive to storage locality concerns; for example, storage for running threads is cached on VPs and is recycled for immediate reuse when a thread terminates. Moreover, multiple threads may share the same execution context whenever data dependencies warrant.

4. The Program Model: Sting permits exceptions to be handled across threads, supports non-blocking I/O, permits the customized scheduling of virtual processors in the same way that the scheduling of threads on virtual processors is customizable, and provides an infra-structure for implementing multiple address spaces and shared persistent objects. Sting also supports efficient message-passing communication via the use of first class polymorphic ports. Ports serve to alleviate overheads in the implementation of shared memory on disjoint memory platforms.

The present invention of a software architecture for controlling a highly parallel computer system integrates an operating system (Sting), a base language and a compiler into an abstract machine. The starting point is a high level programming language, such as Scheme. The programming language is augmented with efficient abstractions including threads, virtual processors and policy managers. This novel operating system includes mechanisms that take advantage of current architectural trends that place a premium on data locality.

The result is a mechanism for building efficient coordination structures for parallel computing. The use of lightweight threads provides a foundation for advanced programming environments. Support for data locality results in an efficient asynchronous system.

Central to the system performance is the concept of a virtual topology. A virtual topology defines a relation over a collection of virtual processors; processor topologies configured as trees, graphs, hypercubes and meshes are some of the well-known examples. A virtual processor is an abstraction that defines scheduling, migration and load balancing policies for the threads it executes. The virtual topologies are intended to provide a simple and expressive high level framework for defining complex thread/processor mappings that abstracts low-level details of a physical interconnection.

Threads created by a computation are mapped to processors in the virtual topology via mapping functions associated with the topology. These mapping functions are user definable. Given an implementation of a system using virtual topologies on a particular multiprocessor platform, it is possible to define procedures that map virtual processors in the virtual topology to physical processors in the platform.

The code itself is machine independent insofar as it does not contain any reference to physical processors or their interconnection. All concerns related to thread mapping and locality are abstracted in the specification of the virtual topology used by the program and the manner in which nodes in the topology are traversed during program execution.

The benefit of virtual topologies and processor mappings is not only efficiency but also portability so that implementations of parallel algorithms need not be specialized for different physical topologies. Since the mapping algorithm used to associate threads with processors is specified as part of a virtual topology, programmers have fine control over how threads should be mapped to virtual processors. If the communication requirements of the threads generated by a computation are known in advance, the ability to explicitly allocate these threads onto specific virtual processors can lead to better load balancing than can an implicit mapping strategy. The structure of a control and dataflow graph defined by a parallel algorithm can be exploited in a number of ways. If a collection of threads share common data, it is possible to construct a topology that maps the virtual processors on which these threads execute to the same physical processor. Virtual processors are multiplexed on physical processors in the same way threads are multiplexed on virtual processors. If a collection of threads have significant communication requirements, it is possible to construct a topology that maps threads that communicate with one another onto virtual processors close together in the virtual topology. If thread $T_1$ has a data dependency with the value yielded by another thread $T_2$, it is reasonable to map $T_1$, and $T_2$ on the same virtual processor. In fine grained programs where processors are busy most of the time, the ability to schedule data-dependent threads on the same or a nearby processor leads to opportunities for improved thread granularity. Finally, certain algorithms have a process structure that unfolds as the computation progresses, such as adaptive tree algorithms. These algorithms are best executed on topologies that allow dynamic creation of virtual processors.

Other novel aspects of the software architecture include the role of continuations and first class procedures in the implementation of an efficient and general-purpose multithreaded operating system and programming environment. Continuations are used to implement state transition operations, exception handling and important storage optimizations. A continuation is an abstraction of a program point. It is represented as a procedure of one argument that defines the remaining computation needed to be performed from the program point it denotes.

A Sting virtual address space is composed of a set of areas. Areas are used for organizing data that exhibit strong temporal or spatial locality. Sting supports a variety of areas: thread control blocks, stacks, thread private heaps, thread shared heaps etc. Data are allocated to areas based on their intended use and lifetime and thus, different areas can have different garbage collectors associated with them.

Exceptions and interrupts are always handled in the execution context of some thread, as is the case with a thread-level context-switch. Exception handlers are implemented as ordinary Scheme procedures and dispatching an exception primarily involves manipulating continuations.

Insofar as Sting is a programming system that permits the creation and management of lightweight threads of control, it shares several common traits with thread package systems developed for other high-level languages. These systems also view threads as a manifest datatype, support preemption in varying degrees, and in certain restricted cases, permit programmers to specify a specialized scheduling regimen. The thread abstraction defines the coordination sublanguage in these systems.

There are some important differences, however, that clearly distinguish Sting from these other systems. First, the scheduling and migration protocol Sting uses is completely customizable; different applications can run different schedulers without modifying the thread manager or the virtual processor abstraction; such customization can be applied to the organization of the virtual machine itself. Second, Sting's support for data locality, storage optimization, and process throttling via thread absorption is absent in other systems. Moreover, all thread operations are implemented directly within the Sting virtual machine: there is no context switch to a lower level kernel that must be performed in order to execute a thread operations. Sting is built on an abstract machine intended to support long-lived applications, persistent objects, and multiple address spaces. Thread packages provide none of this functionality since (by definition) they do not define a complete program environment.

Since Sting is designed as a systems programming language, it provides low-level concurrency abstractions— application libraries can directly create thread objects, and can define their own scheduling and thread migration strategies. High-level concurrency constructs are realizable using threads, but the system does not prohibit users from directly using thread operations in the ways described above, if efficiency considerations warrant. In particular, the same application may define concurrency abstractions with different semantics and efficiency concerns within the same runtime environment.

In certain respects, Sting resembles other advanced multi-threaded operating systems: for example, it supports non-blocking I/O calls with call-back, user control over interrupts, and local address space management as user-level operations. It separates user-level and kernel-level concerns: physical processors handle (privileged) system operations and operations across virtual machines; virtual processors implement all user-level thread and local address-space functionality. However, because Sting is an extended dialect of Scheme, it provides the functionality and expressivity of a high-level programming language that typical operating system environments do not offer.

Sting is a platform for building asynchronous programming primitives and experimenting with new parallel programming paradigms. In additional, the design also allows different concurrency models to be evaluated competitively. Scheme offers an especially rich environment in which to undertake such experiments because of its well-defined semantics, its overall simplicity, and its efficiency. However, the Sting design itself is language independent; and thus, it could be incorporated fairly easily into any high-level programming language.

Sting does not merely provide hooks for each concurrency paradigm and primitive considered interesting. Instead the focus is on basic structures and functionality common to a broad range of parallel programming structures; thus, the implementation of blocking is easily used to support speculative computation. The thread absorption optimization used to throttle the execution of threads is well-suited for implementing futures and tuple-space synchronization, and, finally, customizable policy managers make it possible to build fair and efficient schedulers for a variety of other paradigms.

A principal object of the present invention is therefore, the provision of a computer operating system architecture for controlling a highly parallel multiprocessor/multicomputer system to serve as a highly efficient substrate for modern programming languages.

A further object of the present invention is the provision of a software architecture for asynchronous computation based upon customizable virtual machines.

Another object of the present invention is the provision of a software architecture which supports lightweight threads on virtual processors as first-class objects.

A still further object of the present invention is the provision of a software architecture which includes customizable policy management, particularly at the user level.

A yet another object of the present invention is the provision of a software architecture which includes customizable virtual topologies.

An object of the present invention is the provision of a software architecture which includes thread absorption, delayed TCB allocaton, and thread groups as a locus of storage sharing.

An object of the present invention is the provision of a software architecture system which includes polymorphic ports.

Other and still further objects of the present invention will be best understood when the following description is read in conjunction with the accompanying drawing.

BRIEF DESCRIPTION OF THE DRAWING

FIG. 6 is an illustrative program demonstrating programming with threads;

FIG. 7 is an illustrative program for creating a 3D mesh of virtual processors multiplexed on a 2D mesh of physical processors;

FIG. 8 is a program for initiating a context switch;

FIG. 9 is a program for finishing a context switch;

FIG. 10 is a program for starting a new thread;

FIG. 11 is a program of the top-level procedures for a fine-grained adaptive parallel sorting algorithm; and FIG. 12 is a program defining block-on-set.

DETAILED DESCRIPTION

Figure 1:
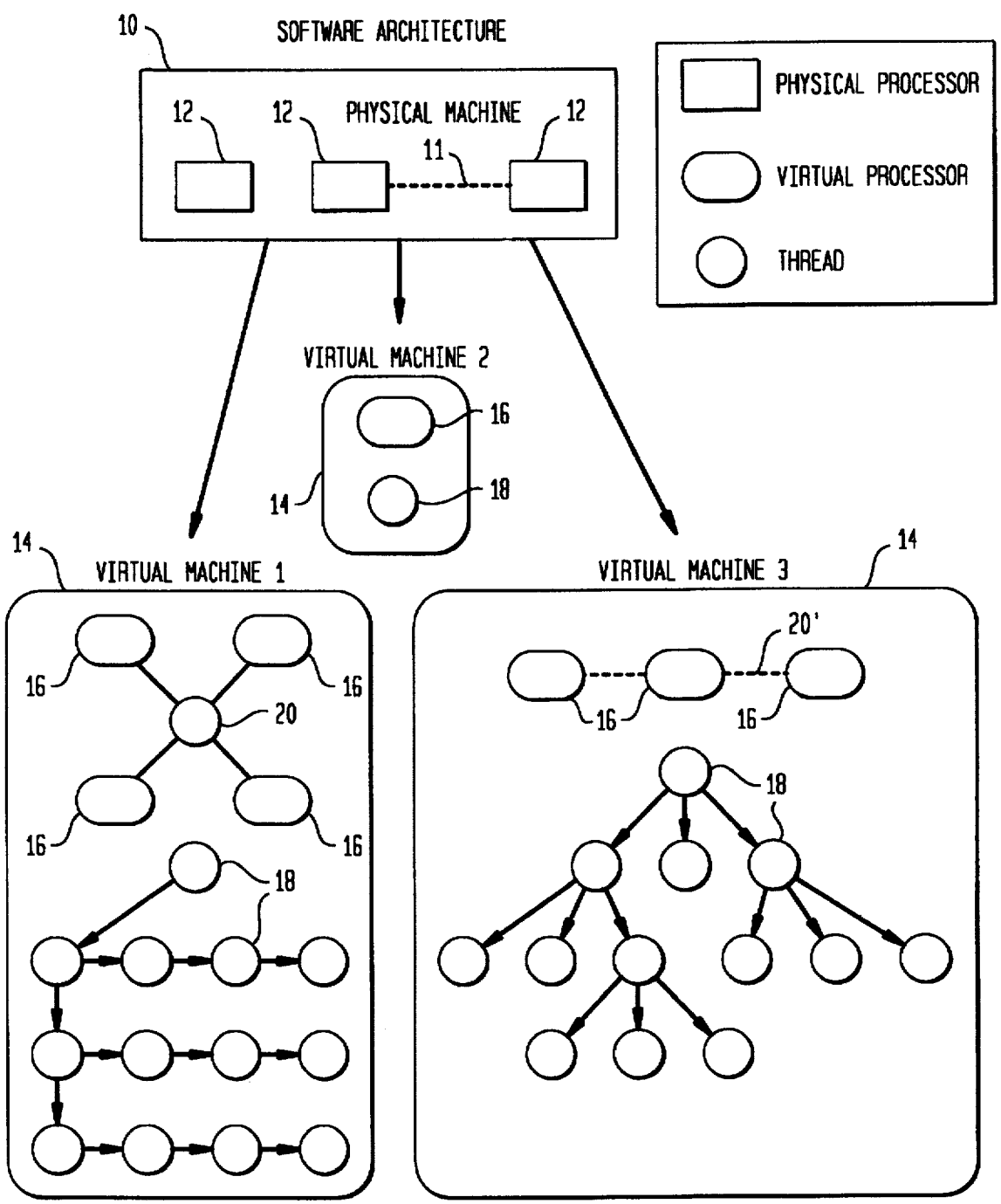
FIG. 1 is a schematic block diagram representation of the software architecture comprising the present invention.

Referring now to the figures and to FIG. 1 in particular, there is shown a schematic block diagram representation of the software architecture comprising the present invention.

An Abstract Physical Machine (PM) 10 comprises a set of Abstract Physical Processors (PP) 12 connected to each other in a Physical Topology (PT) 11. The Abstract Physical Machine is used to execute a set of Virtual Machines (VM) 14. Each Virtual Machine, in turn, comprises one or more Virtual Processors (VP) 16 connected in a Virtual Topology (VT) 20, 20'. Threads (T) 18 execute on one or more of the virtual processors in the same virtual machine. Moreover, a particular thread may migrate between different virtual processors in the same virtual machine 14. A thread policy manager (TPM) 19 (shown in FIGS. 2 and 3) controls the thread scheduling and thread load balancing policy. The interactions among and the details of the different elements are described below.

Figure 2:
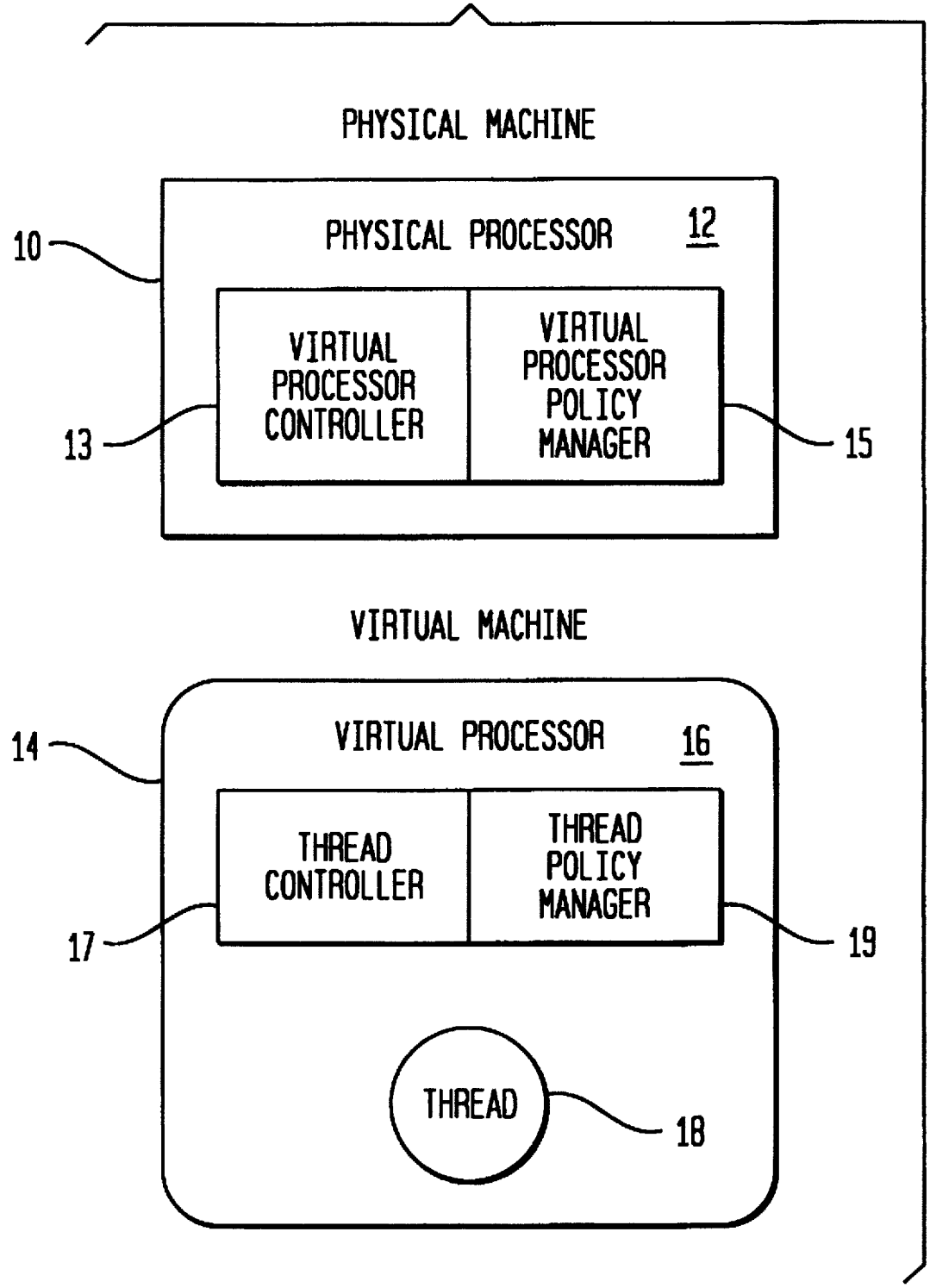
FIG. 2 is a representation of an abstract physical machine and a virtual machine.

The software architecture (also sometimes referred to as the operating system architecture) can be considered as an arrangement comprising several layers of abstraction (FIG. 2). The first layer includes the abstract physical machine 10, which contains a set of abstract physical processors 12. This layer corresponds to what is referred to as the micro-kernel in state-of-the-art operating systems. The next layer includes virtual machines 14 and virtual processors 16. A virtual machine comprises a virtual address space and a set of virtual processors that are connected in a virtual topology. Virtual machines are mapped onto abstract physical machines, with each virtual processor mapped onto an abstract physical processor. The third layer of abstraction defines threads 18. The threads are lightweight processes that run on virtual processors.

For example, a virtual topology might represent a tree of virtual processors that is mapped onto physical processors that are physically connected in a mesh topology. Virtual topologies allow the programmer to express a program in a (virtual) topology that is suitable to the algorithm being implemented. Sting provides an efficient mapping from a virtual topology onto the actual physical topology of the target machine. Virtual topologies also allow parallel programs to be portable across different physical topologies.

The main components in the coordination sublanguage of Sting are lightweight threads of control and the virtual processors. Threads are simple data structures that encapsulate local storage (i.e., registers, stacks and heaps), code, and relevant state information (i.e., status, priorities, preemption bits, locks, etc.). They define a separate locus of control The system imposes no constraints on the code encapsulated by a thread: any valid Scheme expression can be treated as a distinct process.

Figure 3:
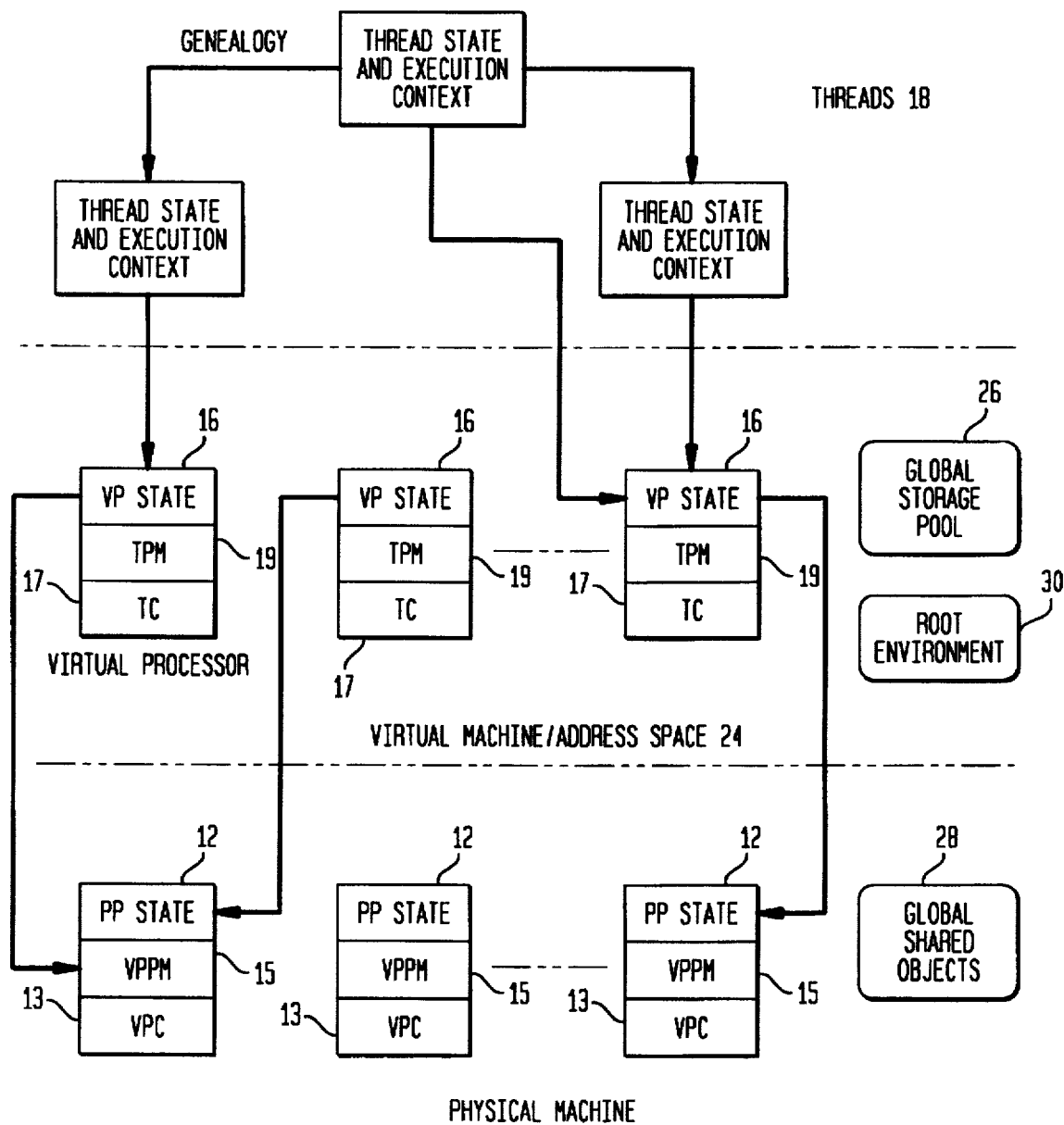
FIG. 3 is a schematic block diagram representation of the abstract architecture of the operating system.

Referring to FIGS. 2 and 3. Each virtual processor (VP) 16 includes a Thread Controller (TC) 17 which implements a state transition function on threads and a Thread Policy Manager (TPM) 19 which implements both a thread scheduling and load-balancing/migration policy. While within the same virtual machine each VP shares the thread controller, different VPs may contain different thread policy managers.

Virtual processors 16 are multiplexed on physical processors 12 in the same way that threads 18 are multiplexed on virtual processors. Each physical processor corresponds to a computing engine in a multiprocessor environment. Associated with each physical processor PP is a virtual processor controller 13 and a virtual processor policy manager 15. The virtual processor controller will context switch among virtual processors because of preemption, or because it is explicitly requested to do so. The virtual processor policy manager handles scheduling decisions for virtual processors 16 that execute on a physical processor PP. For example, a virtual processor may relinquish control of its physical processor if no threads are executing on it, and none can be migrated from any other VP. Physical processors may run virtual processors of any virtual machine found in the system.

Virtual machines encapsulate a single address space 24 accessible exclusively by its associated virtual processors and threads. Virtual machines may share global information (e.g., libraries, file systems, etc.) located in global storage pool 26 and are responsible for mapping global objects 28 (i.e., objects resident in a global address space) into their local address space. Virtual machines also contain the root of a live object graph (i.e., the root environment 30) that is used to trace all live objects in its address space.

All Sting objects (including threads, VPs, and virtual machines) reside in a persistent memory. The memory is organized in terms of a collection of disjoint areas. Objects are garbage collected within an area using a generational collector. An object can reference any other object found in its address space. Objects initially reside in short-lived thread-local areas. Objects that survive garbage collection percolate upwards in the generation hierarchy. This functionality is completely transparent to the user.

A first-class object is an object that can be passed as an argument to a procedure, returned as a result from a procedure or stored in data structures. In a preferred embodiment of the present invention abstract physical machines, abstract physical processors, virtual machines, virtual processors, thread groups and threads are all first-class objects. In an alternative embodiment, only threads and virtual processors are first-class objects.

The Sting compiler is a modified version of Orbit. Orbit is described in an article by D. Kranz, et at, entitled "Orbit: An Optimizing Compiler for Scheme" in ACM SIGPLAN Notices, 21 (7): 219–233, July 1986. The target machine seen by the compiler includes a dedicated thread register to hold a reference to the currently running thread object. Moreover, time critical operations such as those that save and restore registers on a context switch, or allocate thread storage (i.e., stack and heaps) are provided as primitive operations. Sequential Scheme programs will compile and execute without modification. Sting implementations of futures, distributed data structures, and speculative concurrency operations also exist; Scheme programs can be freely augmented with the concurrency operations supported by any of these paradigms.

Threads are first-class objects in Sting. Thus, they may be passed as arguments to procedures, returned as results, and stored in data structures. Threads can outlive the objects that create them. A thread's state contains a thunk, a nullary procedure that is invoked when the thread executes. The value of the application is stored in the thread on completion. For example, evaluating the expressions:

(fork-thread (+y(* x z))) creates a lightweight thread of control that invokes the thunk (lambda ( ) (+y(* x z))) .

The evaluation environment of this thunk is the lexical environment of the fork-thread expression.

Figure 4:
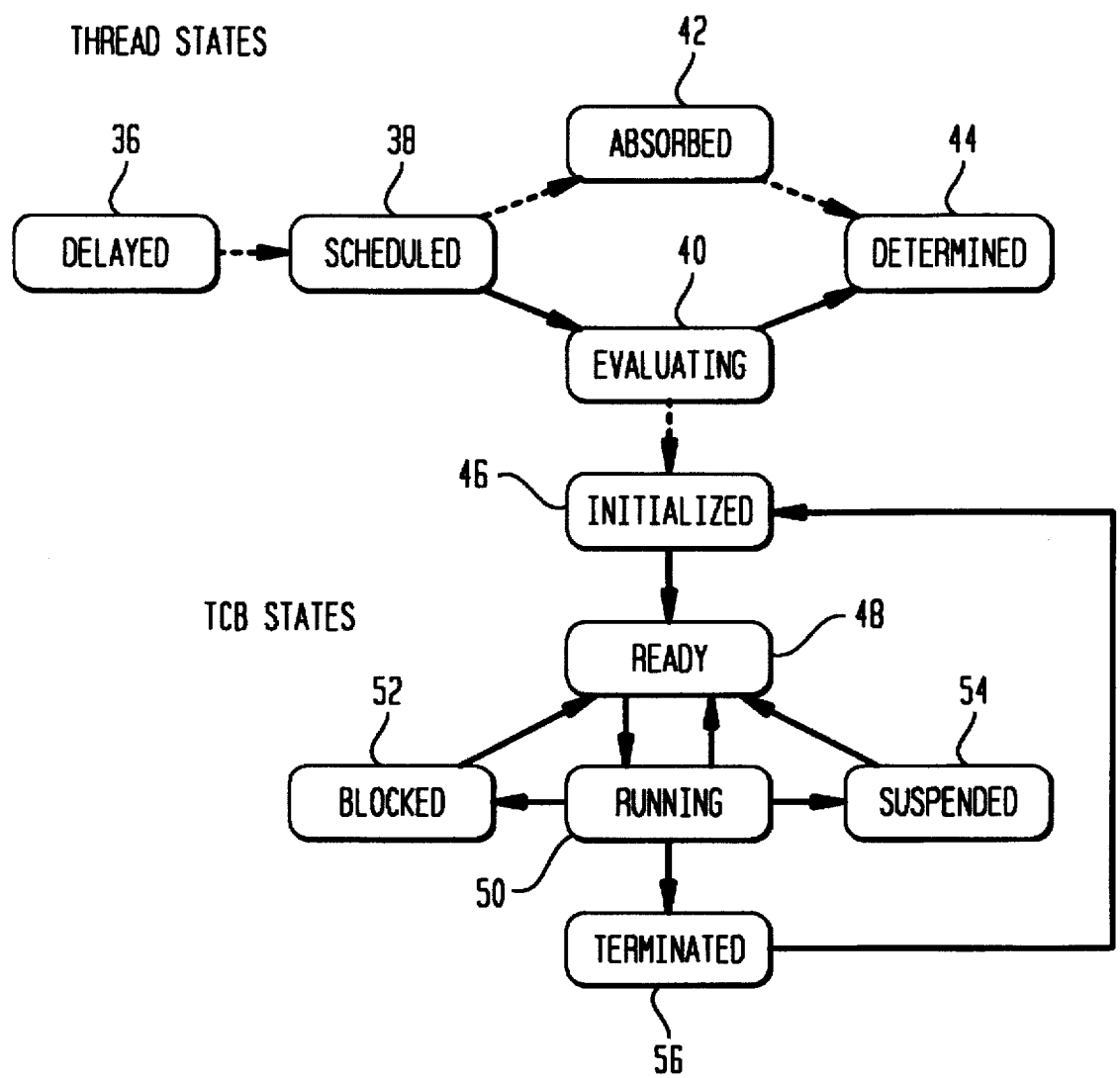
FIG. 4 is a thread state and TCB-state transition diagram.
Figure 5:
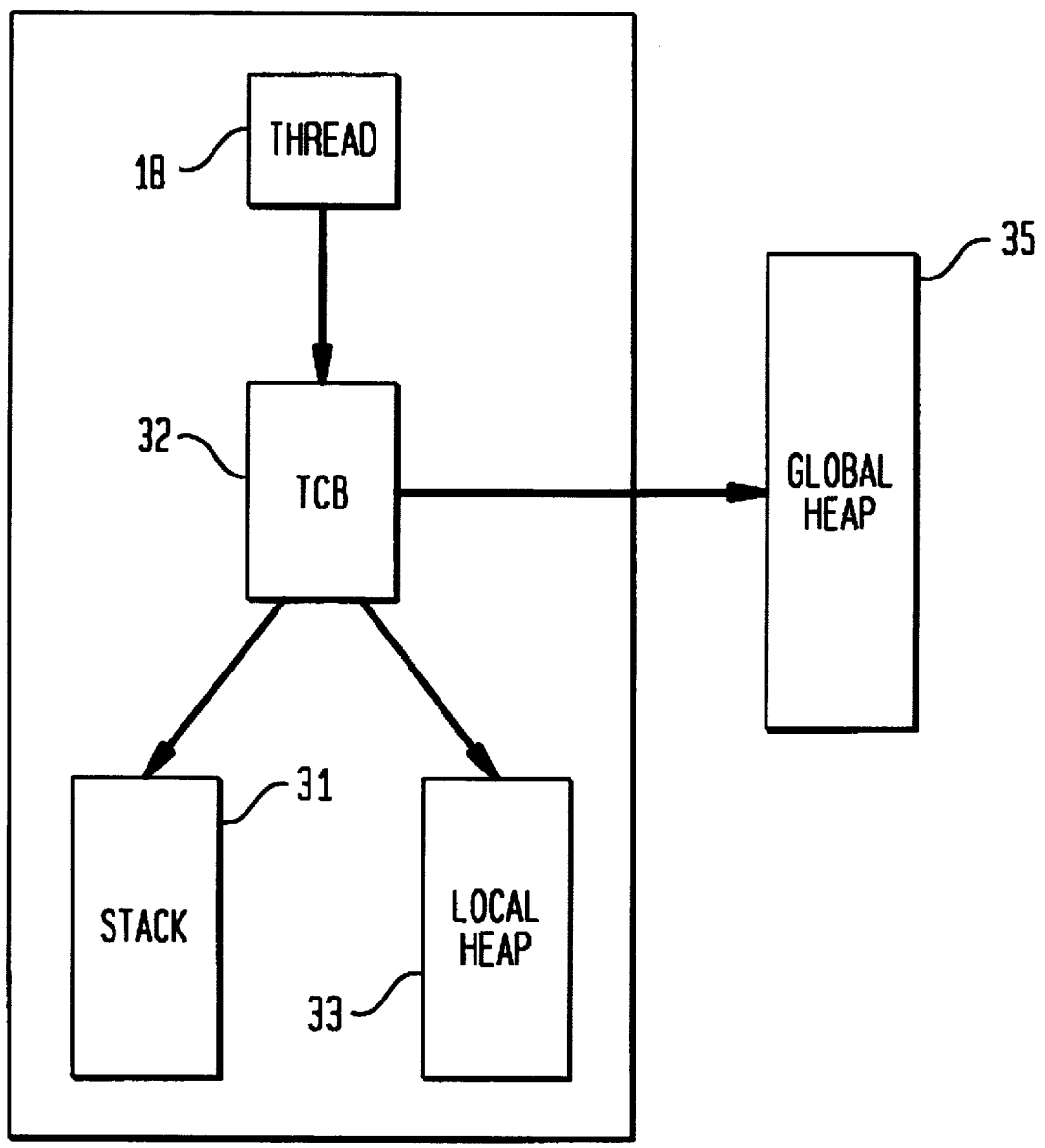
FIG. 5 is an schematic representation of a storage organization.

A thread records status information as part of its state (see FIGS. 4 and 5).

A thread can be either delayed 36, scheduled 38, evaluating 40, absorbed 42 or determined 44. A delayed thread will never be run unless the value of the thread is explicitly demanded. A scheduled thread is a thread that is known to some VP, but which has not yet been allocated storage resources. An evaluating thread is a thread that has started running. A thread remains in this state until the application of its thunk yields a result, at which point its state becomes determined. Absorbed threads are an important specialization of evaluating threads and are discussed in more detail below.

In addition to state information and the code to be evaluated, a thread also contains (1) references to other threads waiting for it to complete, (2) the thunk's dynamic and exception environment, (3) genealogy information including its parent, siblings, and children.

Each thread also has dynamic and exception environments that are used to implement fluid (or dynamic) bindings and exception handling. Genealogy information serves as a useful debugging and profiling tool that allows applications to monitor the dynamic unfolding of a process tree.

The implementation of threads requires no alteration of the other primitive operations in the language. The synchronization semantics of a thread is a more general (albeit lower-level) form of the synchronization facility available via e.g., MultiLisp's "touch", Linda's tuple-space, or CML's "sync".

The application completely controls the condition under which blocked threads may be resumed. However, there is explicit system support for dataflow (i.e., future-touch), non-deterministic choice, and constraint-based or barrier synchronization.

Users manipulate threads via a set of procedures (listed below) defined by a thread controller (TC) which implements synchronous state transitions on a thread's state. The TC preferably is written entirely in Scheme with the exception of two primitive operations to save and restore registers. The thread controller allocates no storage; thus, a TC call never triggers a garbage collection. In addition to these operations, a thread can enter the controller because of preemption. Thread procedures include:

(fork-thread expr vp) creates a thread to evaluate expr, and schedules it to run on vp.

(delay-thread expr) creates a delayed thread that when demanded (via thread-value) evaluates expr.

(thread-run thread vp) inserts a delayed, blocked or suspended thread into vp's ready queue.

(thread-wait thread) causes the thread executing this operation to block until thread's state becomes determined.

(thread-block thread . blocker) requests thread to block; blocker is the condition on which the thread is blocking.

(thread-suspend thread . quantum) requests thread to suspend execution. If the quantum argument is provided, the thread is resumed when the period specified has elapsed; otherwise, the thread is suspended indefinitely until it is explicitly resumed using thread-run.

(thread-terminate thread . values) requests thread to terminate with values as its result.

(yield-processor) causes the current thread to relinquish control of its VP. The thread is inserted into a suitable ready queue.

(current-thread) returns the thread executing this operation.

(current-virtual-processor) returns the virtual processor on which this operation is evaluated.

To illustrate how users might program with threads, consider the program shown in FIG. 6 which defines a simple prime finder implementation. The definition makes no reference to any particular concurrency paradigm; such issues are abstracted by its op argument.

This implementation relies on a user-defined synchronizing thread abstraction that provides a blocking operation on stream access (hd) and an atomic operation for appending to the end of a thread (attach).

Various implementations of a prime number finder may be defined that exhibit different degrees of asynchronous behavior. For example,

```
(let ((filter-list (list)))
  (sieve (lambda (thunk)
    (set filter-list (cons (delay-thread (thunk))
      (filter-list))))))
``` defines an implementation in which filters are generated lazily; once demanded, a filter repeatedly removes elements off its input stream, and generates potential primes onto its output stream. To initiate a new filter scheduled on a VP using a round-robin thread placement discipline, it is possible to write:

```
(thread-run (car filter-list)
  (mod (1+ (vm.vp-vector (vp.vm (current-virtual-processor))))
    n))
```

The expression, (vp.vm (current-virtual-processor)) defines the virtual machine of which the current VP is a part. A virtual machine's public state includes a vector containing its virtual processors.

By slightly rewriting the above call to sieve, we can express a more lazy implementation:

```
(let ((filter-list (list)))
  (sieve (lambda (thunk)
    (set filter-list
      (cons (create-thread
        (begin
          (map thread-run filter-list)
          (thunk)))
        filter-list))
      (map thread-block filter-list))
    n))
```

In this definition, a filter that encounters a potential prime p, creates a lazy thread object L and requests all other filters in the chain to block. When L's value is demanded, it unblocks all the elements in the chain, and proceeds to filter all multiples of p on its input thread. This implementation throttles the extension of the sieve and the consumption of input based on demand.

It is also possible to define an eager version of the sieve as follows:

```
(sieve (lambda (thunk)
  (fork-thread-(thunk) (current-vp)))
  n)
```

Evaluating this application schedules a new thread responsible for filtering all multiples of a prime; this thread is scheduled on the virtual processor executing this operation. In this call, an evaluating thread is generated whenever a new prime is encountered.

Sting treats thread operations as ordinary procedures, and manipulates the objects referenced by them just as any other Scheme object; if two filters attached via a common stream are terminated, the storage occupied by the stream may be reclaimed. Sting imposes no a priori synchronization protocol on thread access—application programs are expected to build abstractions that regulate the coordination of threads.

The threads created by filter may be terminated in one of two ways. The top-level call to sieve may be structured so that it has an explicit handle on these threads; the filter-list data structure used to create a lazy sieve is such an example. One can then evaluate:

```
(map thread-terminate filter-list)
``` to terminate all threads found in the sieve. Alternatively, applications may use thread groups to collectively manage these threads.

Thread Groups

Sting provides thread groups as a means of gaining control over a related collection of threads. A thread group is created by a call to fork-thread-group; this operation creates a new group and a new thread that becomes the root thread of that group. A child thread shares the same group as its parent unless it explicitly creates a new group. A thread group includes a shared heap accessible to all its members. When a thread group terminates via the call, (thread-group-terminate group), all live threads in the group are terminated and its shared heap is garbage collected.

A thread group also contains debugging and thread operations that may be applied en masse to all of its members. Thread groups provide operations analogous to ordinary thread operations. (e.g., termination, suspension, etc.) as well as operations for debugging and monitoring (e.g., listing all threads in a given group, listing all groups, profiling, genealogy information, etc..) Thus, when thread T is terminated, users can request all of T's children (which are defined to be part of T's group to be terminated) thus:

(thread-group-terminate (thread.group T))

Thread groups are an important tool for controlling sharing in a hierarchical memory architecture. Since objects shared by members in a groups are contained in the group's shared heap, they are preferably physically close to one another in memory, and thus better locality is exhibited. Threads groups can also be used as a locus for scheduling. For example, a thread policy manager might implement a scheduling policy in which no thread in a group is allowed to run unless all threads in the group are allowed to run; this scheduling regime is similar to a "gang scheduling" protocol. Thread groups can be used in conjunction with virtual topologies to improve data locality.

Execution Contexts and Thread Control Blocks

When a thread begins evaluating, an execution context is allocated for it. Every evaluating thread is associated with an execution context that is also known as a Thread Control Block (TCB) 32 (FIG. 5). A TCB is a generalized representation of a continuation and includes its own stack 31 and local heap 33. Both stacks and heaps can be chained, and heaps are garbage collected using a generational scavenging collector. Besides storage objects, a TCB includes an associated lock, values of all live registers extant at the time the thread last performed a context switch, the thread's sub-state (e.g., initialized, ready, evaluating, blocked, suspended, etc.), the VP on which the thread was last executing, thread priority, and time quantum.

The thread state and sub-state transition diagram is shown in FIG. 4. TCB states reflect the operations allowed on evaluating threads. If evaluating thread T has TCB $T_{TCB}$, the state field of $T_{TCB}$ indicates one of the following:

initialized 46: The stack and heap associated with $T_{TCB}$ have been initialized, but no code has yet been executed.

ready 48: T can execute on any available VP, but is not currently executing on any.

running 50: T is currently executing on some VP.

blocked 52: T is currently blocked on some thread or condition.

suspended 54: T is suspended for some potentially infinite duration.

terminated 56: T has finished executing and is cleaning up residual state.

Unlike threads, TCB's are not first-class user-visible objects; they are accessible only to thread controllers and thread policy managers. When a new thread is ready to run, a TCB is allocated for it; when a thread becomes determined, its TCB is available for use by the thread controller for threads created subsequently. TCBs never escape into user maintained data structures; they are manipulated exclusively by system-level procedures.

The Sting implementation defers the allocation of storage for a thread until necessary. In other thread packages, the act of creating a thread involves not merely setting up the environment for the thread to be forked, but also allocating and intializing storage. This approach lowers efficiency in two important respects: first, in the presence of fine-grained parallelism, the thread controller may spend more time creating and initializing threads than actually running them. Second, since stacks and process control blocks are immediately allocated upon thread creation, context switches among threads often cannot take advantage of cache and page locality. In addition, if TCB allocation is not delayed the total memory requirements of the system can be significantly increased.

Thread control blocks in Sting are recyclable resources that are managed by virtual processors. A TCB is allocated for a thread only when the thread begins evaluation. The allocation strategy is designed to improve data locality. A TCB may be allocated to a thread T that is to run on VP V in one of four ways:

1. If the thread currently executing on V has just terminated, its context is available for immediate re-allocation. Its TCB is the best candidate for allocation because it has the most locality relative to its VP. The physical caches and memory associated with this VP are most likely to contain the execution context of the thread mostly recently running on that VP.

2. If the currently executing thread has not terminated, a TCB for T is allocated from a LIFO pool of TCBs maintained on V. Here again, the execution context is the one with the most locality.

3. If V's pool is empty, a new TCB is allocated from a global pool that is also organized in LIFO order. Every local VP pool maintains a threshold τ of the number of TCBs it may hold. When a pool overflows, its VP moves half the TCBs in the local pool to the global pool; when the local pool underflows, τ/2 TCBs are moved from the global pool to the VP-local one. Global pools serve two roles: (1) to minimize the impact of program behavior on TCB allocation and reuse, and (2) to ensure a fair distribution of TCBs to all virtual processors.

4. Finally, if no TCB is available either in the global or local pool, a new set of τ/2 TCBs is dynamically created and allocated to T. Since new TCBs are created only if both the global and the VP local pool are empty, the number of TCBs actually created during the evaluation of a Sting program is determined collectively by all VPs.

Virtual Processors

Virtual processors (and by extension, virtual machines) are first-class objects in Sting. According first-class status to VPs has several important implications that distinguish Sting from both high-level thread systems and other asynchronous parallel languages. First, one can organize parallel computations by explicitly mapping processes onto specific virtual processors. For example, a thread P known to communicate closely with another thread Q that is executing on VP V should execute on a VP topologically near V. Such considerations can be expressed in Sting since VPs can be directly denoted. Systolic style programs for example can be expressed by using self-relative addressing off the current VP (e.g., current-VP, left-VP, right-VP, up-VP, etc). The system provides a number of default addressing modes for many common topologies (e.g., hypercubes, meshes, systolic arrays, etc). Furthermore, since VPs can be mapped onto specific physical processors, the ability to manipulate virtual processors as first-class data values gives Sting programmers a great deal of flexibility in expressing different parallel algorithms that are defined in terms of specific processor topologies.

To illustrate, consider the program shown in FIG. 7 which creates a 3D mesh of virtual processors multiplexed on a two dimensional mesh of physical processors. The array has height and width equal to the height and width of the physical machine. The mapping collapses the three dimensional array onto the two dimensional array by mapping every element in the depth dimension to the same virtual processor. Thus, the number of virtual processors created is the same as the number of physical processors. All threads mapped onto a processor at the same depth execute on the same VP. The procedures get-pm-height and get-pm-width are provided by the physical machine interface. Absolute addressing of virtual processors is simply an array reference into the array returned by create-3D-mesh.

The create-vp procedure creates a new VP running on the physical processor returned by get-pp. Having created a topology, it is possible to build self-relative addressing procedures off the current VP; for example, it is possible to define an up-VP procedure that moves up one dimension in the topology thus:

```
(define (up-VP)
  (let ((address (vp-address (current-virtual-processor))))
    (array-ref 3D-mesh (vector-ref address 0))))
```

1. Create a set of virtual processors which are mapped onto an appropriate physical processor.
2. Associate an address in the virtual topology with each VP.
3. Store the virtual processor in a data structure used for absolute addressing in the virtual topology, and define appropriate access routines on that structure.
4. Define procedures for self-relative addressing.

Thread Controller

The thread controller handles the virtual processor's interaction with other system components such as physical processors and threads. The most important function of the thread controller is to handle the state transitions of threads. Whenever a thread makes a state transition that results in it yielding the virtual processor on which it is currently running, the thread controller calls the thread policy manager to determine which thread to run next.

The implementation of the Sting thread controller highlights a number of interesting issues. The central state transition procedures are shown in FIGS. 9 and 10. Operations on TCBs found in these procedures are not available to user applications. Since the thread controller is written in Sting, all synchronous calls to TC procedures are treated as ordinary procedure calls; thus, live registers used by the procedure running in the current thread are saved automatically in the thread's TCB upon entry into the controller.

The start-context-switch procedure (FIG. 8) takes the desired next state for the current thread (i.e., the thread which has entered the TC) as its argument.

Preemption is first disabled. A new thread (or TCB) is then returned by the procedure tpm-get-next-thread.

If there are no runnable threads, the procedure returns false. In this case, the current thread is re-run (assuming it is in a ready state), or the proceedure tpm-vp-idle is called with the current VP as its argument. The procedure tpm-vp-idle may perform various bookkeeping operations or it may request its physical processor to switch to another VP.

If the object bound to next is the current TCB, no action is taken, and the current thread resumes immediately. If the object returned is another TCB, its state is to set to running, its VP field is set to the current VP, the current TCB is either recycled in the TCB pool (if its state is dead), or its registers are saved, and the state of the new TCB is restored into processor registers.

If the object returned is a thread that has no execution context, a TCB is allocated for it. This TCB may be the current TCB if the next-state field is dead, or a TCB allocated from the VP-local or global pool. The thread starts execution using the primitive procedure start-new-tcb; it applies the procedure start-new-thread (see FIG. 10) using the new TCB as its execution context.

The finish-context-switch code (FIG. 9) is executed by the thread returned by start-context-switch; its purpose is to release locks held by the switched-out thread (called previous in the procedure), to set the VP field of the new thread, enqueue previous onto a ready queue if appropriate, and reestablish the preemption timer. By enqueuing previous only after a new thread is established on a VP, the controller eliminates any race condition between effecting a state transition and enqueuing a thread onto a VP's ready queue. The procedures, tpm-enqueue-ready-thread and tpm-enqueue-suspended-thread are implemented by the thread policy manager.

The code for start-new-thread is shown in FIG. 10. A thread object with thunk $E_t$ can begin evaluation once a TCB is allocated for it, and it becomes associated with a default error handler and appropriate cleanup code. Throws to exit (the catch point established by start-new-thread) from $E_t$ cause the thread stack to be unwound properly, thereby permitting resources such as locks held by the thread to be properly released. The exit code following the evaluation of $E_T$ garbage collects the thread stack and heap, stores the value yielded by $E_t$ as part of the thread state, wakes up all threads waiting for this value, and makes a tail recursive call to the state transition procedure to choose a new thread to run. Because $E_t$ is wrapped within a dynamic wind form, it is guaranteed that thread storage will be garbage collected even if a thread terminates abnormally.

Garbage collection must take place before the thread's waiters are awakened because objects that outlive the thread (including the object returned by the thread's thunk) and contained its local heap must be migrated to another to do so would allow other threads to obtain references to the newly terminated thread's storage; this would clearly be erroneous since a determined thread's storage may be allocated to other threads.

Thread Policy Manager

Each virtual processor contains a thread policy manager. The thread policy manager makes all policy decisions relating to the scheduling and migrations of threads on virtual processors. The thread controller is a client of the thread policy manager and it is inaccessible to user code. The thread controller calls the thread policy manager whenever it needs to make a decision concerning: the initial mapping of a thread to a virtual processor; which thread a virtual processor should run next when the current thread releases the virtual processor for some reason; or when and which threads to migrate to/from a virtual processor.

While all virtual processors have the same thread controller, each virtual processor may have a different policy manager. This ability is particularly important for real time applications where each processor may be controlling a different subsystem with different scheduling requirements.

The thread policy manager presents a well-defined interface to the thread controller. The data structures that the thread policy managers use to make their decisions are completely private to them. They may be local to a particular thread policy manager or shared among the various thread policy managers, or some combination thereof, but they are never available to any other part of the system. The thread policy manager can thus be customized to provide different behaviors for different virtual machines. This allows the user to customize policy decisions depending on the type of program being run.

Since VPs can contain different thread policy managers, different groups of threads created by an application may be subject to different scheduling regimes. Virtual machines or virtual processors can be tailored to handle different scheduling protocols or policies.

The Sting thread controller defines a thread state transition procedure, but does not define a priori scheduling or load-balancing policies. These policies can be application dependent. Although several default policies are provided as part of the overall Sting runtime environment, users are free to write their own policies. In fact, referring to FIG. 3, each virtual processor 16 contains its own thread policy manager (TPM) 19; thus, different VPs in a given virtual machine may implement different policies. The TPM 19 handles thread scheduling, processor/thread mapping, and thread migration.

The ability to partition an application into distinct scheduling groups is important for long-lived parallel (or interactive) programs. Threads executing I/O bound procedures have different scheduling requirements from those executing compute bound routines; applications with realtime constraints should be implemented using different scheduling protocols than those that require only a simple FIFO scheduling policy.

Tree-structured parallel programs may perform best using a LIFO-based scheduler; applications running master/slave or worker farm algorithms may do better using a round-robin preemptive scheduler for fairness. Since all of these applications may be components of a larger program structure or environment, the flexibility afforded by having them evaluate with different policy managers is significant. Distinct applications can exist as independently executing collections of threads evaluating on the same virtual machine. Moreover, each distinct scheduler can have a thread policy manager with different performance characteristics and implementation concerns.

The present invention seeks to provide a flexible framework that is able to incorporate different scheduling regimes transparently to the user without requiring modification to the thread controller itself. To this end, all TPMs must conform to the same interface although no constraints are imposed on the implementations themselves. The interface set forth below provides operations for choosing a new thread to run, enqueuing an evaluating thread, setting thread priorities, and migrating threads. These procedures are expected to be used exclusively by the TC; in general, user applications need not be aware of the thread policy manager/thread controller interface.

(tpm-get-next-thread vp) returns the next ready thread to run on vp.

(tpm-enqueue-ready-thread vp obj) enqueues obj which may be either a thread or a TCB into the ready queue of the TPM associated with vp.

(tpm-priority priority) and (tpm-quantum quantum) are guard procedures that verify that their arguments are a valid priority or quantum respectively.

(tpm-allocate-vp vp thread) allocates thread on vp; if vp is false, thread is allocated on a virtual processor determined by the TPM.

(tpm-vp-idle up) is called by the thread manager if there are no evaluating threads on vp. This procedure can migrate a thread from another virtual processor, do bookkeeping, or call the physical processor to have the processor switch itself to another VP.

(tpm-enqueue-suspended-thread vp thread) suspends thread on vp's suspend queue.

Besides determining a scheduling order for evaluating threads, the TPM implements two basic load-balancing decisions: (1) it may choose a VP on which a newly created thread should be run, and (2) it determines which threads on its VP can be migrated, and which threads it will choose for migration from other VPs.

The first decision point is important for handling initial load-balancing; the second is important for supporting dynamic load-balancing protocols. Determining the initial placement of a newly evaluating thread is often based on priorities different from those used to determine the migration of currently evaluating threads. The TPM interface preserves this distinction.

Scheduling policies can be classified along several important dimensions:

Locality: Is there a single global queue of threads in this system, or does each TPM maintain its own local queues?
State: Are threads distinguished based on their current state? For example, an application might choose an implementation in which all threads occupy a single queue regardless of their current state. Alternatively, it might choose to classify threads into different queues based on whether they are evaluating, scheduled, previously suspended, etc.
Ordering: Are the queues implemented as FIFO's, LIFO's, round-robin, priority, or realtime structures (among others)?
Serialization: What kind of locking structure does an application impose on various policy manager queues?

Choosing different alternatives in this classification scheme results in different performance characteristics. For example, if a granularity structure is adapted that distinguishes evaluating threads (i.e., threads with TCBs) from scheduled ones, and the constraint that only scheduled threads can be migrated is imposed, then no locks are required to access the evaluating thread queue; this queue is local to the VP on which it was created. Queues holding scheduled threads however must be locked because they are targets for migration by TPMs on other VPs. This kind of scheduling regimen is useful if dynamic load-balancing is not an issue. Thus, when there exist many long-lived non-blocking threads (of roughly equal duration), most VPs will be busy most of the time executing threads on their own local ready queue. Eliminating locks on this queue in such applications is therefore beneficial. On the other hand, applications that generate threads of varying duration may exhibit better performance when used with a TPM that permits migration of both scheduled and evaluating threads even if there is an added cost associated with locking the runnable ready queue.

Global queues imply contention among thread policy managers whenever they need to execute a new thread, but such an implementation is useful in implementing many kinds of parallel algorithms. For example, in master/slave (or workerfarm) programs, the master initially creates a pool of threads; these threads are long-lived structures that do not spawn any new threads themselves. Once running on a VP, they rarely block. Thus, a TPM executing such a thread has no need to support the overhead of maintaining a local thread queue. Local queues are useful, however, in implementing result-parallel programs in which the process structure takes the form of a tree or graph; these queues can be used in such applications to load balance threads fairly among a set of virtual processors.

Message-Passing Abstractions

Message-passing is to be an efficient communication mechanism on disjoint memory architectures, especially for parallel applications that are coarse-grained, or have known communication patterns. A port is a data abstraction provided in Sting to minimize the overheads of implementing shared memory on disjoint memory architectures. First-class procedures and ports exhibit a synergy in this context.

Sting allows message-passing abstractions to be integrated within a shared-memory environment. A port is a first-class data object that serves as a receptacle for messages that may he sent by other threads. Since Sting uses a shared virtual memory model, any complex data structure (including closures) can be communicated through a port. This flexibility permits Sting applications to implement user level message-passing protocols transparently and to combine the best features of shared memory and message passing within a unified environment.

Ports are first class data structures. There are two basic operations provided over ports:

1. (put obj port) copies obj to port. The operation is asynchronous with respect to the sender.
2. (get port) removes the first message in port, and blocks if port is empty.

Objects read from a port P are copies of objects written to P. This copy is a shallow copy i.e., only the top-level structure of the object is copied, the substructure is shared. The ports are designed with copying semantics because they are designed to be used when shared memory would be inefficient. While the standard version of put does a shallow copy, there is also a version available that does a deep copy; this latter version not only copies the top-level object, but also all its substructures.

For example, sending a closure in a message using shallow copying involves constructing a copy of the closure representation, but preserving references to objects bound within the environment defined by the closure. The choice of copy mechanisms used clearly is influenced by the underlying physical architecture, and the application domain. There are a range of message transmission implementations that can be tailored to the particular physical substrate on which the Sting implementation resides.

Thus, evaluating the expression, (put (lambda ( ) E) port)

transmits the closure of the procedure (lambda ( ) E) to port. If a receiver is defined on port thus,

```
(define (receiver port)
  (let ((msg (get port)))
    (fork-thread (msg) (current-vp))
    (receiver)))
``` the procedural object sent is evaluated on the virtual processor of the receiver. By creating a new thread to evaluate messages, the receiver can accept new requests concurrently with the processing of old ones.

This style of communication has been referred to as "active messages" since the action that should be taken upon message receipt is not encoded as part of the underlying implementation but determined by the message itself. There is a great deal of flexibility and simplicity afforded by such a model since the virtual processor/thread interface does not require any alteration in order to support message communication. Two aspects of the Sting design are crucial for realizing this functionality: (1) the fact that objects reside in a shared virtual memory allow all objects (including those containing references to other objects,e.g., closures) to be transmitted among virtual processors freely, and (2) first-class procedures permit complex user-defined message handlers to be constructed; these handlers can execute in a separate thread on any virtual processor. On distributed memory machines, objects would reside in a distributed shared virtual memory. To illustrate, in the above example, E may be a complex query of a database. If a receiver is instantiated on the processor on which the database resides, such queries do not involve expensive migration of the database itself. Communication costs are reduced because queries are directly copied to the processor on which the database resides; the database itself does not need to migrate to processors executing queries. The ability to send procedures to data rather than more traditional RPC-style communication leads to a number of potentially significant performance and expressivity gains.

First-class procedures and lightweight threads make active message passing an attractive high-level communication abstraction. In systems that support active messages without the benefit of these abstractions, this functionality is typically realized in terms of low-level support protocols. First-class procedures make it possible to implement active messages trivially. An active message is a procedure sent to a port. First-class ports have obvious and important utility in distributed computing environments as well and lead to a simpler and cleaner programming model than traditional RPC.

Memory Management

Sting uses a shared virtual memory model. Implementations of Sting on distributed memory platforms must be built on top of a distributed shared virtual memory substrate. Thus, the meaning of a reference does not depend on where the reference is generated, or where the object is physically located.

Storage Organization

In Sting, there are three storage areas associated with every TCB 32 (FIG. 5). The first, a stack 31, is used to allocate objects created by the thread whose lifetime does not exceed the dynamic extent of its creator. More precisely, objects allocated on a stack may only refer to other objects that are allocated in a current (or earlier) stack frame, or which are allocated on some heap. Stack allocated objects can refer to objects in heaps because the thread associated with the stack is suspended while the heap 33 is garbage collected; references contained in stacks are part of the root set traced by the garbage collector.

Thread private or local heaps 33 are used to allocated non-shared objects whose lifetimes might exceed the lifetime of the procedures that created them. The term "might exceed" is used because it is not always possible for the compiler to determine the lifetime of an object in programming languages such as Scheme or ML. Furthermore, it may not be possible to determine the lifetimes of objects in languages which allow calls to unknown procedures. References contained in private heap can refer to other objects in the same private heap, or objects in shared or global heaps 35, but they cannot refer to objects in the stack 31. References in the stack may refer to objects in the private heap, but references in the shared heap may not. Private heaps lead to greater locality since data allocated on them are used exclusively by a single thread of control; the absence of interleaving allocations among multiple threads means that objects close together in the heap are likely to be logically related to one another.

No other thread can access objects that are contained in a thread's stack or local heap. Thus, both thread stacks and local heaps can be implemented in local memory on the processor without any concern for synchronization or memory coherency. Thread local heaps are actually a series of heaps organized in a generational manner. Storage allocation is always done in the youngest generation in a manner similar to other generational collectors. As objects age they are moved to older generations. All garbage collection of the local heap is done by the thread itself. In most thread systems that support garbage collection all threads in the system must be suspended during a garbage collection. In contrast, Sting's threads garbage collect their local heaps independently and asynchronously with respect to other threads. Thus other threads can continue their computation while any particular thread collects its local heap; this leads to better load balancing and higher throughput. A second advantage of this garbage collection strategy is that the cost of garbage collecting a local heap is charged only to the thread that allocates the storage, rather than to all threads in the system.

Sting provides "thread groups" as a means of gaining control over a related collection of threads. Every thread is associated with some thread group. A child thread is in the same group as its parent unless it is created as part of a new group. Thread groups provide operations analogous to ordinary thread operations (e.g., termination, suspension, etc.) as well as operations for debugging and monitoring (e.g., listing all threads in a given group, listing all groups, profiling, genealogy information, etc.) In addition, a thread group also includes a "shared heap" accessible to all its members.

A shared heap or global heap 35 of a thread group is allocated when the thread group is created. The shared heap like the local heap is actually a series of heaps organized in a generational manner. References in shared heaps may only refer to the objects in shared heaps. This is because any object that is referenced from a shared object is also a shared object and, therefore must reside in a shared heap. This constraint on shared heaps is enforced by ensuring that references stored in shared heaps refer to objects that are (a) either in a shared heap, or (b) allocated in a local heap and garbage collected into a shared one. That is, the graphs of objects reachable from the referenced object must be copied into or located in the shared heap. The overheads of this memory model depend on how frequently references to objects allocated on local heaps escape. Experience has shown that in implementing fine-grained parallel programs, most objects allocated on a local heap remain local to the associated thread, and are not shared. Those objects that are shared among threads often are easily detected either via language abstractions or by compile-time analysis.

To summarize, the reference discipline observed between the thread areas associated with a thread are as follows: (1) references in the stack refer to objects in its current or previous stack frame, its local heap, or its shared heap. (2) references in the local heap refer to objects on that heap or to objects allocated on some shared heap, and (3) references in the shared heap refer to objects allocated on its shared heap (or some other shared heap).

Like local heaps, global heaps are organized in a generational manner, but garbage collection of global heaps is more complicated than that for local heaps because many different threads can simultaneously access objects contained in the global heap. Note that as a result, global heap allocation requires locking the heap.

In order to garbage collect a global heap, all threads in the associated thread group (and its inferiors) are suspended. This is because any of these threads can access data in the global heap. However, other threads in the system, i.e., those not interior to the group associated with the heap being collected, continue execution independent of the garbage collection.

Each global heap has a set of incoming references associated with it. These sets are maintained by checking for stores of references that cross area boundaries. After the threads associated with the global heap have been suspended, the garbage collector uses the set of incoming references as the roots for the garbage collection. Any objects reachable from the incoming reference set are copied to the new heap. When the garbage collection is complete the threads associated with the global heap are resumed.

Abstract Physical Machines and Abstract Physical Processors

The operating system's lowest-level abstraction is a micro-kernel called the Abstract Physical Machine (APM).

The APM plays three important roles in the Sting software architecture:

1. It provides a secure and efficient foundation for supporting multiple virtual machines.
2. It isolates all other components in the system from hardware dependent features and idiosyncrasies.
3. It controls access to the physical hardware of the system.

The APM is implemented within a special virtual machine called the root virtual machine. This machine has access to all facilities available in any other virtual machine including a virtual address space, virtual processors, and threads. In addition, the root virtual machine has access to abstract physical processors, device drivers, and a virtual memory manager. The fact that the abstract physical machine is organized in terms of virtual machines leads to some important expressivity gains. There are no heavyweight threads. All threads are lightweight. There are no kernel threads or stacks for implementing system calls. All system calls are handled using the execution context of the thread making the system call. This is possible because Scheme is a safe language (i.e., dangling pointers, free coercion between address and data, etc., are not possible), and portions of the APM are mapped into every virtual machine in the system. Asynchronous programming constructs available to user threads are also available to threads found in the APM. APM-related threads can be controlled in the same manner as any other thread in a virtual machine. Threads which block executing a kernel operation inform their virtual processor of this fact. The VP is then free to execute some other thread. This is true for both inter-thread communication and I/O; Sting's treatment on non-blocking kernel calls provides the same capability as e.g., scheduler activations, or Psyche's virtual processor abstraction.

Virtual machines are created and destroyed by the APM. Creating a new virtual machine entails the following:

1. Creating a new virtual address space,
2. Mapping the APM kernel into this address space,
3. Creating a root virtual processor in this virtual machine,
4. Allocating abstract physical processors to this machine,
5. Scheduling the root virtual processor to run on an abstract physical processor.

Destroying a virtual machine entails generating signals to terminate all running threads on that machine, closing any devices opened by threads executing in the machine, and finally deallocating the virtual address space associated with this machine.

Each processor abstraction 12 is composed of a virtual processor controller (VPC) 13 and virtual processor policy manager (VPPM) 15. The relationship between the VP controller and the VP policy manager is similar to that between the thread controller and the thread policy manager, i.e. the VP controller is a client of the VP policy manager. Whenever the VP controller needs to make a policy decision it calls the VP policy manager to make that decision.

While all physical processors run the same VP controller, they can run different VP policy managers. This allows a multiprocessor system to customize the system's use of each physical processor. It is also possible for the system to run the same VP policy manager on each of the physical processors.

When a virtual machine wishes to schedule a virtual processor on an abstract physical processor it calls the virtual processor controller on that physical processor. Likewise, when a virtual machine wishes to remove a virtual processor from an abstract physical processor it calls the virtual processor controller on that physical processor. Each VP controller manages the virtual processors which are mapped onto its physical processor, including all virtual processor state changes.

The VP policy manager makes all policy decisions relating to the scheduling and migration of virtual processors on physical processors. There are three types of decisions: First it determines the VP to PP map. The mapping takes place at two distinct times, when the VP is run for the first time and when a VP which has been blocked is rerun. Second, the policy manager also determines the order in and duration for which VPs on a PP are run. Finally, the VP policy manager decides when a VP should be moved (migrated) from one processor to another.

These three decisions allow the VP policy manager to balance the work load on a machine and determine the fairness properties of the physical machine with respect to virtual machines. They also allow VP policy managers to decide where to move the VPs of a fault tolerant VM when a physical processor fails.

Like the thread policy manager the VP presents a well-defined interface to the VP controller. The data structures which the VP policy manager uses to make its decisions are completely private to it. These data structures may be local to a particular VP policy manager or shared among the various instances of the VP policy manager, or some combination thereof, but no other component of the system has access to them. The VP policy manager can be customized to provide different behaviors to different instances of Sting. This functionality allows it to be customized for different operating system environments as diverse as real time, interactive, or computationally intensive systems.

Finally, while the thread policy manager is concerned with load balancing and fairness among threads, the virtual processor policy manager is concerned with load balancing and fairness among virtual machines and virtual processors.

Each physical processor inan APM includes a virtual processor controller (VPC), and a virtual processor policy manager (VPPM). In this sense, physical processors are structurally identical to virtual processors. The VPC effects state changes on virtual processors. Like threads, virtual processors may be running, ready, blocked or terminating. A running VP is currently executing on a physical processor; a ready VP is capable of running, but is currently not. A blocked VP is executing a thread waiting on some external event (e.g. I/O). The VPPM is responsible for scheduling VPs on a physical processor; its scheduling policies are similar to those used by a TPM. The VPPM presents a well-defined interface to the VP controller; different Sting systems can contain different VP policy managers.

Exception Handling

Synchronous exceptions and interrupts are handled uniformly in Sting. Associated with every exception is a handler responsible for performing a set of actions to deal with the exception. Handlers are procedures that execute within a thread. An exception raised on processor P executes using the context of P's current thread. There are no special exception stacks in the Sting micro-kernel.

When an exception (e.g., invalid instruction, memory protection violation, etc.) is raised on processor P, P's current continuation (i.e., programs counter, heap frontier, stack, etc.) is first saved. The exception dispatcher then proceeds to find the target of the exception, interrupting it if the thread is running, and pushing the continuation of the handler and its arguments onto the target thread's stack. Next, the dispatcher may choose to (a) resume the current thread by simply returning into it, (b) resume the target thread, or (c) call the thread controller to resume some other thread on this processor. When the target thread is resumed, it will execute the continuation found on the top of its stack; this is the continuation of the exception handler.

The implementation of exceptions in Sting is novel in several respects:

1. Handling an exception simply involves calling it since it is a procedure.
2. Exceptions are handled in the execution context of the thread receiving it.
3. Exceptions are dispatched in the context of the current thread.
4. Exceptions once dispatched become the current continuation of the target thread and are executed automatically when the thread is resumed.
5. An exception is handled only when the target thread is resumed.
6. Exception handling code is written in Scheme and manipulates continuations and procedures to achieve the desired effect.

Sting is able to provide this model of exceptions because first-class procedures and threads, manifest continuations, dynamic storage allocation, and a uniform addressing mechanism are all central features of its design.

The target thread of a synchronous exception is always the current thread. Asynchronous exceptions or interrupts are treated slightly differently. Since interrupts can be directed at any thread (not just the currently executing one), handling such exceptions requires the handler to either process the exception immediately, interrupt the currently running thread to handle the exception, or create a new handler thread. Since interrupt handlers are also Scheme procedures, establishing a thread to execute the handler or using a current thread for that purpose merely involves setting the current continuation of the appropriate thread to call the handler. The pseudo code for a Sting exception dispatcher is:

```
1:  (define (exception-dispatcher type . args)
2:    (save-current-continuation)
3:    (let ((target handler (get-target&handler type args)))
```

```
4:         (cond ((eq? target (current-thread))
5:           (apply handler args))
6:         (else
7:           (signal target handler args)
8:         (case ((exception-priority type))
9:           ((continue) (return))
10:          ((immediate) (switch-to-thread target))
11:          ((reschedule) (yield-processor)))))))
```

In line 2, the current continuation is saved on the stack of the current thread. The continuation can be saved on the stack because it cannot escape and it will only be called once. On line 3 the dispatcher finds the thread for which the exception is intended and the handler for the exception type. Line 4 checks to see if the target of the exception is the current thread and if so does not push the exception continuation (line 5). Rather, the dispatcher simply applies the handler to its arguments. This is valid since the dispatcher is already running in the context of the exception target, i.e. the current thread. If the target of the exception is not the current thread, the dispatcher sends the exception to the target thread (line 7). Sending a thread a signal is equivalent to interrupting the thread and pushing a continuation containing the signal handler and its arguments onto the thread's stack, and resuming the thread which causes the signal handler to be executed. After signaling the target thread, the handler decides which thread to run next on the processor (line 8). It may be itself (line 9), the target thread (line 10), or the thread with the highest priority (line 11).

There is one other important distinction between Sting's exception handling facilities and those found in other operating systems. Since threads that handle exceptions are no different from other user-level threads in the system (e.g. they have their own stack and heap), and since exception handlers are ordinary first-class procedures, handlers are free to allocate storage dynamically. Data generated by a handler will be reclaimed by a garbage collector in the same way that any other datum is recovered. The uniformity between the exception handling mechanism and higher-level Sting abstractions allows device driver implementors expressivity and efficiency not otherwise available in parallel languages or operating systems.

Sting is able to provide this model of exceptions because first-class procedures and threads, manifest continuations, dynamic storage allocations, and a uniform addressing mechanism are all central features of its design.

Concurrency Paradigms

Having provided detailed description of the software architecture, several diverse concurrency paradigms will be expressed and implemented with the present software architecture.

In a result parallel program, each concurrently executing process contributes to the value of a complex data structure (e.g., an array or list), or is a member of a complex process graph. Process communication is via this result structure or graph. Expressions that attempt to access a component of the result whose contributing process is still evaluating block until the process completes.

Futures are a good example of an operation well-suited for implementing result parallel algorithms. The object created by the MultiLisp or Mul-T expression, (future E), creates a thread responsible for computing E; the object returned is known as a future. When E finishes, yielding v as its result, the future is said to be determined. An expression that touches a future either blocks if E is still being computed or yields v if the future is determined.

In a naive implementation of the sorting program given in FIG. 11 each instantiation of a future will entail the creation of a new thread. This behavior is undesirable because a future computing at level i in the process tree has a manifest data dependence with its children at level i+1 and so on. Poor processor and storage utilization will result, given the data dependencies found in this program. This is because many of the lightweight processes that are created will either: need to block when they request the value of other as of yet unevaluated futures or, in the case of processes of computing small primes, for example, do a small amount of computation relative to the cost incurred in creating them.

Because the dynamic state of a thread consists of large objects (e.g., stacks and heaps), cache and page locality is compromised if process blocking occurs frequently or if process granularity is too small.

The semantics of touch and future dictate that a future F which touches another future G must block on G if G is not yet determined. Assume $T_F$ and $T_G$ are the thread representation of F and G, respectively. The runtime dynamics of the touch operation on G can entail accessing $T_G$ either when $T_G$ is (a) delayed or scheduled, (b) evaluating, or (c) determined. In the latter case, no synchronization between these threads is necessary. Case (b) requires $T_F$ to block until $T_G$ completes. Sting performs an important optimization for case (a), however, which is discussed below.

$T_F$ can evaluate the closure encapsulated within $T_G$ (call it E) using its own stack and heap, rather than blocking and forcing a context switch. In effect, this implementation treats E as an ordinary procedure, and the touch of G as a simple procedure call; it is said that $T_F$ absorbs $T_G$ in this case. The correctness of this optimization lies in the observation that $T_F$ would necessarily block otherwise; by applying E using $T_F$'s dynamic context, the VP on which $T_F$ executes does not incur the overhead of executing a context switch. In addition, no TCB need be allocated for $T_G$ since $T_F$'s TCB is used instead.

This optimization may only lead to observably different results if used in instances where the calling thread need not necessarily block. For example, suppose $T_G$ was an element of a speculative call by $T_F$. Furthermore, assume $T_G$ diverges, but another speculative thread (call it $T_H$) does not. In the absence of absorption, both $T_G$ and $T_H$ would spawn separate thread contexts. In the presence of absorption, however, $T_F$ may absorb $T_G$ and thus will also loop because $T_G$ does. Users can parameterize thread state to inform the TC if a thread can absorb or not; Sting provides interface procedures for this purpose.

Because of absorption, Sting reduces the overhead of context switching, and increases process granularity for programs in which processes exhibit strong data dependencies among one another. Of course, for the operation to be most effective, thread granularity must be sufficiently large to permit scheduled threads to become absorbed; if process granularity is too small, processors will begin evaluation of threads that may potentially be absorbed before the absorbing threads can demand their values.

Load-based inlining and lazy task creation are two other similar optimizations that have been applied in other parallel Lisp systems. Load-based inlining causes a thread to be inlined (i.e., absorbed) if the current system load exceeds some specified threshold. Not only does this optimization require programmer involvement, under certain conditions it may induce deadlock or starvation for programs which would otherwise terminate. This is because the inlining decision is irrevocable; thus, it imposes a specific evaluation order on tasks whose data dependencies might require a different evaluation order. Thread absorption does not suffer from this problem since absorption occurs only when a thread would otherwise block, and only when data dependencies warrant.

Lazy task creation solves many of the problems associated with load-based inlining—it always inlines the evaluation of every thread, but permits this inlining operation to be revocable if processors become idle. Threads are never created unless actually needed. This scheme requires no programmer intervention, does not induce deadlocks in programs which would otherwise not exhibit them, and reduces the number of tasks actually generated.

Thread absorption differs from lazy tasks in two major respects: (1) Thread absorption works even in the presence of scheduling protocols determined by the application; lazy task creation assumes a global LIFO schedule, and the presence of a single queue to hold inlined threads. (2) Lazy task creation uses one global heap per processor. This implementation results in less locality when a task is stolen than occurs with thread absorption. Secondly, garbage collection in the presence of lazy task creation requires all threads in the system to be stopped (even though the collector itself may be parallel). This constraint does not apply for thread absorption.

Another example is the master-slave paradigm which is a popular parallel program structuring technique. In this approach, the collection of processes generated is bounded a priori; a master process generates a number of worker processes and combines their results. Process communication typically occurs via shared concurrent data structures or variables. Master-slave programs often are more efficient than result parallel ones on stock multiprocessor platforms because workers rarely need to communicate with one another except to publish their results, and process granularity can be better tailored for performance.

Sting has been used to build an optimizing implementation of first-class tuplespaces in Scheme. A tuple-space is an object that serves as an abstraction of a synchronizing content-addressable memory; tuple-spaces are a natural implementation choice for many master/slave-based algorithms.

Since tuples are objects and tuple-operations are binding expressions, not statements, the presence of first-class denotable tuple-spaces results in added modularity and expressivity. In the preferred implementation, tuple-spaces can be specialized as synchronized vectors, queues, streams, sets, shared variables, semaphores, or bags; the operations permitted on tuple-spaces remain invariant over their representation. In addition, applications can specify an inheritance hierarchy among tuple-spaces if so desired.

Processes can read, remove or deposit new tuples into a tuple-space. The tuple argument in a read or remove operation is called a "template" and may contain variables prefixed with a "?". Such variables are referred to as "formals" and acquire a binding-value as a consequence of the match operation. The bindings acquired by these formals are used in the evaluation of a subordinate expression: thus, it is possible to write:

```
(get TS [?x]
  (put TS [(+ x 1)]))
``` to remove atomically a singleton tuple from TS, increment it by one, and deposit it back into TS.

The present implementation also takes advantage of thread absorption to permit the construction of fine-grained parallel programs that synchronize on tuplespaces. Threads are used as bona fide elements in a tuple. Consider a process P that executes the following expression:

(rd TS[x1 x2]E)

where x1 and x2 are non-formals. Assume furthermore that a tuple in TS is deposited as a consequence of the operation: (spawn TS[$E_1$ $E_2$]). This operation schedules two threads (call them $T_{E_1}$ and $T_{E_2}$) responsible for computing $E_1$ and $E_2$. If both $T_{E_1}$ and $T_{E_2}$ complete, the resulting tuple contains two determined threads; the matching procedure applies thread-value when it encounters a thread in a tuple; this operation retrieves the thread's value.

If $T_{E_1}$ is still scheduled at the time P executes, however, P is free to absorb it, and then determine if its result matches x1. If a match does not exist, P may proceed to search for another tuple, leaving $T_{E_2}$ potentially in a scheduled state. Another process may subsequently examine this same tuple and absorb $T_{E_2}$ if warranted. Similarly, if $T_{E_2}$'s result matches x1, P is then free to absorb $T_{E_1}$. If either $T_{E_1}$ or $T_{E_2}$ are already evaluating, P may choose to either block on one (or both) thread(s), or examine other potentially matching tuples in TS. The semantics of tuple-spaces imposes no constraints on the implementation in this regard.

Sting's combination of first-class threads and thread absorption allows the writing of quasi-demand driven fine-grained (result) parallel programs using shared data structures. In this sense, the thread system attempts to minimize any significant distinction between structure-based (e.g., tuple-space) and data-flow style (e.g., future/touch) synchronization.

Speculative parallelism is an important programming technique that often cannot be effectively utilized because of runtime overheads incurred in its implementation. The two features most often associated with systems that support a speculative programming model are the ability to favor certain more promising tasks over others, and the means to abort, reclaim (and possibly undo) unnecessary computation.

Sting permits programmers to write speculative applications by:

1. allowing users to explicitly program thread priorities,
2. permitting a thread to wait on the completion of other threads, and
3. allowing threads to terminate other threads.

Promising tasks can execute before unlikely ones because priorities are programmable. A task α that completes first in a set of tasks can awaken any thread blocked on its completion; this functionality permits Sting to support a useful form of OR-parallelism. Task α can terminate all other tasks in its task set once it has been determined that their results are unnecessary. Speculative computation using Sting however, will not be able to undo non-local side-effects induced by useless tasks; the system does not provide a primitive backtracking mechanism.

Consider the implementation of a wait-for-one construct. This operator evaluates its list of arguments concurrently, returning the value yielded by the first of its arguments to complete. Thus, if $\alpha_i$ yields v in the expressions: (wait-for-one $\alpha_1 \alpha_2 \ldots \alpha_i \ldots \alpha_n$) the expressions returns v, and, if desired by the programmer, terminates the evaluation of all the remaining $\alpha_j$, j≠i.

The specification of a wait-for-all construct that implements and AND-parallel operation is similar; it also evaluates its arguments concurrently, but returns true only when all its arguments complete. Thus the expression: (wait-for-all $\alpha_1 \alpha_2 \ldots \alpha_i \ldots \alpha_n$) acts as a barrier synchronization point since the thread executing this expression is blocked until all the $\alpha_i$ is complete. The implementation of this operation is very similar to the implementation of the speculative wait-for-one operation.

The TC implements these operations using a common procedure, block-on-set. Threads and TCBs are defined to support this functionality. For example, associated with a TCB structure is information on the number of threads in the group that must complete before the TCB's associated thread can resume.

Block-on-set takes a list of threads and a count. These threads correspond to the arguments of the wait-for-one and wait-for all operations described above; the count argument represents the number of threads that must complete before the current thread (i.e., the thread executing block-on-set) is allowed to resume. If the count is one, the result is an implementation of wait-for-one; if the count is equal to n, the result is an implementation of wait-for all.

The relationship between a thread $T_g$ in the set and the current thread ($T_w$) that is to wait on T is maintained in a data structure (called a thread barrier (TB)) that contains references 1. $T_w$'s TCB 2. the TB of another waiter blocked on $T_g$ (if one exists). A program defining block-on-set is shown in FIG. 12. The call:

(block-on-set $\equiv T_1 T_2 \ldots T_n$)

causes the current thread (call it T) to unblock upon the completion of m of the $T_i$, $m \leq n$. Each of these $T_i$ have a reference to T in their chain of waiters.

Applications use block-on-set in conjunction with a wakeup-waiters procedure that is invoked by the $\alpha_i$ when they complete. Wakeup-waiters examines the list of waiters chained from the waiters slot in its thread argument. A waiter whose wait-count becomes zero is enqueued on the ready queue of some VP. The TC invokes wakeup-waiters whenever a thread T completes (e.g., whenever it terminates or abnormally exits). All threads waiting on T's completion are thus rescheduled.

Given these two procedures wait-for-one can be defined simply:

```
(define (wait-for-one · block-group)
  (block-on-group 1 block-group)
  (map thread-terminate block-group))
```

If T executes wait-for-one, it blocks on all the threads in its block-group argument. When T is resumed, it is placed on a queue of ready threads in the TPM of some available virtual processor. The map procedure executed upon T's resumption terminates all threads in its group.

Sting's wait-for-all procedure can omit this operation since all threads in its blockgroup are guaranteed to have completed before the thread executing this operation in resumed.

Sting has been implemented on both an 8 processor Silicon Graphics PowerSeries (MIPS R3000) and a 16 processor Silicon Graphics Challenge (MIPS R4400). Both machines are shared-memory (cache-coherent) multiprocessors. The abstract physical machine configuration maps physical processors to lightweight Unix threads; each processor in the machine runs one such thread.

While there has been described and illustrated a preferred embodiment of a computer software architecture, it will be apparent to those skilled in the art that variations and modifications are possible without deviating from the broad principles and spirit of the invention which shall be limited solely by the scope of the claims apended hereto.

What is claimed is:

1. A software architecture for controlling a highly parallel computer system comprising:

abstract physical machines comprising abstract physical processors forming a microkernel;

virtual machines associated with respective abstract physical processors, said virtual machines comprising virtual processors; and thread groups comprising threads which run on said virtual processors, where said virtual processors and said threads are first class objects.

2. A software architecture as set forth in claim 1, where said virtual processors are connected in a virtual topology.

3. A software architecture as set forth in claim 1, where said microckernel policy manager is user customizable.

4. A software architecture as set forth in claim 1, where said virtual processors contain which thread policy managers are user customizable.

5. A software architecture as set forth in claim 1, where said threads, said virtual processors and said abstract physical processors are operatively associated for constructing a virtual topology.

6. A software architecture as set forth in claim 5, where said virtual topology is user customizable.

7. A software architecture as set forth in claim 1, where said threads are separable from their respective execution contexts for allowing delayed allocation of execution contexts.

8. A software architecture as set forth in claim 1, further comprising polymorphic ports.

9. A architecture as set forth in claim 8, where said is a class object.

10. A software architecture as set forth in claim 8, where said threads send messages containing general data and complex data.

11. A software architecture as set forth in claim 1, where said threads garbage collect their respective local stacks and heaps independent of other threads.

12. A software architecture as set forth in claim 1, where thread groups collect their respective shared heaps independently of unrelated thread groups.

13. A software architecture as set forth in claim 1, where said virtual processors are multiplexed on said abstract physical processors.

14. A software architecture as set forth in claim 1, where said virtual processors said virtual machines and said threads reside in a persistent memory.

15. A software architecture as set forth in claim 1, where said abstract physical processors are first class objects.

16. A software architecture as set forth in claim 15, where said virtual machines are first class objects.

17. A software architecture as set forth in claim 16, where said abstract physical machines and said thread groups are first class object.

18. A computer system comprising:

a plurality of customizable abstract physical processors connected in a customizable physical topology each containing a customizable virtual processor controller and a customizable virtual processor policy manager;

a plurality of virtual machines each comprising a virtual address space whose topology is user specifiable and further comprising virtual processors which execute responsive to said virtual processor controller and said virtual processor policy manager and which contain a thread controller and a thread policy manager, said virtual processors being connected in a dynamic virtual topology and each virtual processor being mapped onto a respective abstract physical processor which mapping may be dynamically altered without modification to the implementation; and a plurality of threads for running on said virtual processors responsive to said thread controllers and thread policy managers.

19. A computer system as set forth in claim 18, where said virtual processors are multiplexed on said abstract physical processors.

20. A computer system as set forth in claim 18, further comprising a persistent memory in which objects, including said threads, said virtual processors and said virtual machines, reside.

21. A computer system as set forth in claim 18, where the correspondence between threads and virtual processors and between virtual processors and physical processors and between virtual machines and physical machines are dynamically alterable.

* * * * *